March 11, 1924.　　　　　　　　　　　　　　　　1,486,159
　　　　　　　　G. C. REEVES ET AL
　　　　　　　BREAST TRIMMING MACHINE
　　　　　　　Filed May 11, 1922　　　3 Sheets-Sheet 1
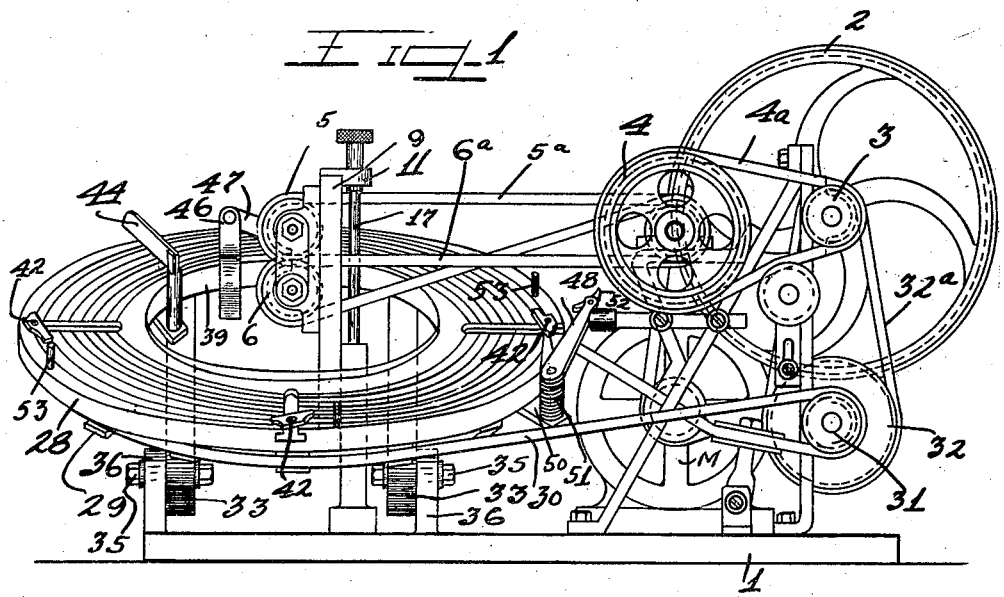
Witnesses
Inventors
GEORGE C. REEVES
JOHN C. HINTZ
REES BEYNON

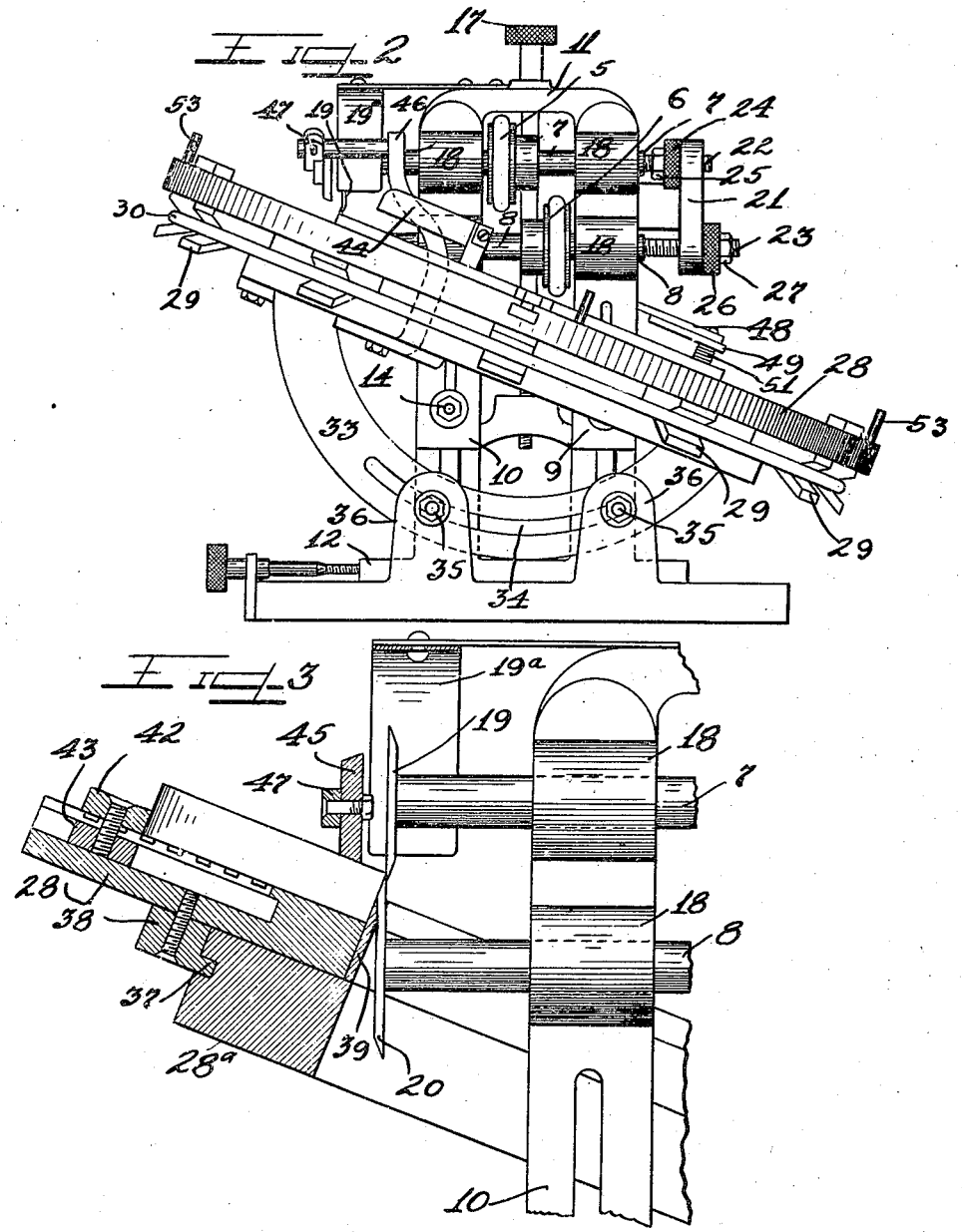

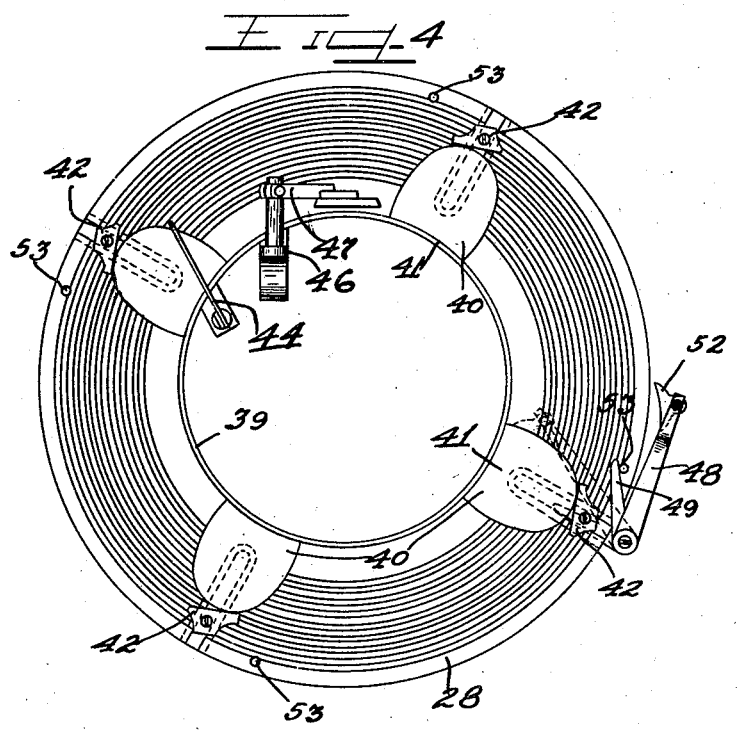
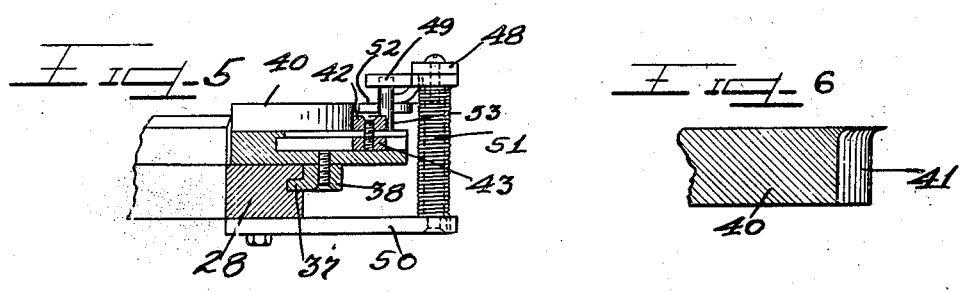

Patented Mar. 11, 1924.

1,486,159

UNITED STATES PATENT OFFICE.

GEORGE C. REEVES, JOHN C. HINTZ, AND REES BEYNON, OF CHICAGO, ILLINOIS, ASSIGNORS TO DRYDEN RUBBER COMPANY, A CORPORATION OF ILLINOIS.

BREAST-TRIMMING MACHINE.

Application filed May 11, 1922. Serial No. 559,988.

*To all whom it may concern:*

Be it known that we, GEORGE C. REEVES, JOHN C. HINTZ, and REES BEYNON, citizens of the United States, and residents of the city of Chicago, in the county of Cook and State of Illinois, have invented certain new and useful Improvements in a Breast-Trimming Machine; and we do hereby declare that the following is a full, clear, and exact description of the same, reference being had to the accompanying drawings, and to the numerals of reference marked thereon, which form a part of this specification.

This invention relates to a breast trimming machine for shoe heels, especially rubber heels.

And it is an object of this invention to provide a machine having trimming elements and a conveyer in biased relation thereto for conveying the heels to the trimming elements.

It is a further object of this invention to provide mechanism for automatically discharging the heels after the breasts thereof have been properly trimmed.

It is also an object of this invention to provide a machine having adjustable cutting elements and an adjustable conveyer for more properly accomplishing their function.

It is also an object of this invention to provide a stripper for removing any improperly positioned heel before it is trimmed.

It is broadly an object of this invention to provide a novel and efficient machine for trimming the breasts of shoe heels, especially those containing or made of rubber.

With these and other objects in view, which will become more apparent in the following description and disclosures in the drawings, this invention comprises the novel mechanisms and combinations hereinafter described and more particularly pointed out and defined in the appended claims.

In the accompanying drawings, which illustrate a preferred embodiment of this invention, and in which similar reference numerals refer to similar features in the different views:

Figure 1 is a side elevational view of the heel trimming machine involving this invention.

Figure 2 is a front elevational view of the machine.

Figure 3 is a fragmentary view partly in section and partly in elevation illustrating certain features upon an enlarged scale.

Figure 4 is a top plan view of the conveyer.

Figure 5 is an enlarged sectional view through a portion of the conveyer illustrating the discharging mechanism.

Figure 6 is an enlarged fragmentary sectional view of a shoe heel.

Figure 7 is a fragmentary view partly in section and partly in elevation of certain adjustable features of the machine upon an enlarged scale.

Figure 8 is a section on the line 8—8 of Figure 7.

In said drawings there is illustrated one embodiment of this invention which broadly comprises mechanism for trimming the breasts of the heels and a conveyer for supporting the heels and conveying them to the trimming mechanism, the said mechanism and conveyer having a biased relation so that only the lower breast margins of the heels may be trimmed. The parts are also made adjustable so that a proper relation of operative parts may be secured and mechanism is provided for stripping heels improperly positioned on the conveyer and for automatically discharging the trimmed heels.

In the illustrated embodiment of this invention, there is shown in Figure 1 a base 1 having a suitable frame-work thereon for supporting the driving mechanism which comprises a driving member 2 which may be a pulley or gear or the like driven by a motor M. A belt pulley 3 is integral with or connected to the driving member 2 and is belted to a second pulley 4 by a belt $4^a$. The pulley 4 has operatively connected therewith a pair of belt pulleys, one of which is belted to a pulley 5 by a belt $5^a$ and the other of which is belted to a pulley 6 by means of a crossed belt $6^a$.

The pulleys 5 and 6 are respectively secured upon shafts 7 and 8 (Fig. 2) which are journalled in a vertically adjustable frame comprising two grooved legs or standards 9 and 10 joined by a yoke member 11 at the top. The standards 9 and 10 are slidably sustained upon a longitudinally adjustable base member 12 mounted in a groove in base 1 and provided with a pair of spaced upwardly directed arms joined by a transverse brace member 13. The arms are provided with projecting tongues which slidingly enter the grooves in the legs 9 and 10 which are adjustably sustained on the arms by means of bolts 14 or the like extending through the slots in the standards and through apertures in said arms. It is obvious that by loosening the nuts on the bolts 14 the standards 9 and 10 may be vertically adjusted.

The longitudinal adjustment of the base member 12 is effected by means of a screw 15 rotatably anchored against longitudinal movement in a lug 16 secured to the base 1, with its screw threaded end engaging in a threaded recess in the base 12. It is obvious that by rotating the screw 15, the base member 12 may be longitudinally adjusted.

The vertical adjustment of the frame that supports the shafts 7 and 8 is preferably effected by means of a vertical screw member 17 which is rotatably anchored against relative vertical movement in the upper end of the yoke 11 with its lower end threaded in the transverse brace member 13 of base 12, so that by loosening the nuts on the bolts 14 and rotating the screw member 17, the said frame may be raised or lowered as is obvious.

The shafts 7 and 8 are journalled in suitable bearings 18 (Fig. 2) which are preferably cast integral with the standards 9 and 10. At one end of shaft 7, a circular cutting or trimming element 19 beveled upon its inner marginal edge is secured, over which a protective hood 19ª may be supported from the top of the yoke 11, and upon the same end of shaft 8 a circular cutting or trimming element 20 is secured which is beveled at its marginal edge upon the outer side. The circumferential margins of these trimming elements overlap slightly, and as the shafts 7 and 8 are rotated in reverse directions, the overlapping margins of these circular trimmers co-operate to trim the upper portions of the breasts of the heels that are brought in contact therewith.

In order to properly gauge the amount to be trimmed from the heels and to also maintain the trimmers in proper relation, the shafts 7 and 8 admit of a limited amount of longitudinal adjustment. For this purpose, a T-shaped bearing extension 21 projects from the outer side of standard 9 for supporting a pair of adjustable end thrust abutments adapted for contacting the ends of the shafts 7 and 8. As shown, these end abutments comprise screws 22 and 23 which are screw threaded through the T bearing 21, the outer ends of the screws being slit for admitting a screw driver. As the shafts 7 and 8 rotate in opposite directions, there will be a tendency to rotate the contacting screws in opposite directions, and to overcome this tendency, a nut 24 is mounted upon the screw 22 to bear against the inner side of the T bearing 21, and a lock nut 25 may be used to lock the nut 24 in position, and a nut 26 is mounted upon the outer end of screw 23 and bears against the outer side of the T bearing 21 and is held in position by a lock nut 27. This construction will prevent the screw 22 from being rotated outwardly by the contacting shaft 7 and the screw 23 from being rotated inwardly by its contacting shaft. The nuts 24 and 26 and their lock nuts, however, may be loosened and the screws 22 and 23 adjusted for longitudinal adjustments of the shafts 7 and 8 and as the trimming elements 19 and 20 are secured upon these shafts, they will be correspondingly adjusted as is obvious.

The heels to be trimmed are brought into operative relation with the trimming elements by means of a conveyer upon which the heels may be secured by an operator. In the present instance, there is illustrated a rotary conveyer 28 comprising a ring-like member surrounding the trimming elements and the standards 9 and 10 and having an upper roughened or corrugated surface for preventing rubber heels from adhering thereto. The lower surface of the conveyer is provided with grooved elements 29 circumferentially arranged for receiving an operating belt 30 which is trained over a pulley 31 operatively connected to a pulley 32 which in turn is connected by a belt 32ª to a pulley driven by the driving member 2. Thus the conveyer is operated simultaneously with the trimming elements by the main driving member 2.

During operation, the conveyer and trimming elements are adapted to assume a biased relation, as shown in Figure 3, whereby the lower edge portions of the heels may be brought into operative relation with the trimming elements. For this purpose, it is desirable that either the conveyor or trimming elements be supported for tilting movement. In the illustrated embodiment of this invention, it has been elected to support the conveyer for such tilting movement. Accordingly, the lower surface of the conveyer is rotatably supported upon a support 28ª which is provided with a pair of arcuate supporting members 33 (Figs. 1 and 2) having curved slots 34 (Fig. 2) whereby they may be adjustably secured by bolts 35 to the base member which is provided with a plurality of upstanding lugs 36 having apertures to receive the bolts 35. In the present instance, each arcuate member is attached to a pair of such upstanding lugs by a pair of bolts 35, as shown in Fig. 2. It is apparent that by loosening the nuts on the bolts 35 the support 28ª and the conveyer supported thereon may be tilted into a biased relation with the trimming elements.

In order to properly sustain the conveyer on its support 28ª, the latter is provided with a circumferential groove or guideway into which fit tongues 37 integral with arcuate blocks 38 secured to the bottom of the conveyer, as shown in Fig. 3. The tongues 37 are adapted to slide freely in the guideway or groove so that the conveyer may be readily rotated thereon. These blocks 38 not only prevent lateral movement of the conveyer, but they also prevent relative upward movement thereof, as is obvious.

The tiltable support 28ª is also in the form of a ring-like member; the inner diameter thereof is, however, slightly less than the inner diameter of the conveyer, as shown in Fig. 3, whereby an annular ledge is formed upon which rests a circular retaining ring 39 which is secured to the inner circumferential surface of the conveyer and extends thereabove to provide a circular retaining abutment for the heels 40 which, as shown in Fig. 4, have their breasts 41 tightly clamped thereagainst by means of clamping blocks 42 which are arranged with their contacting surfaces at angles to diameters of the conveyer whereby the heels may be readily inserted between the annular ring 39 and blocks 42 and retained therebetween by the wedging action of the inclined faces of the clamping blocks.

These clamping blocks 42 are adjustably mounted for the purpose of accommodating different sized heels. In referring to Figs. 3 and 5, it will be noted that each block 42 is secured to a second block 43 frictionally retained but susceptible of movement in a groove extending from the outer circumference of the conveyer to a suitable depth radially of the conveyer and that the groove communicates with a narrower slot extending through the top surface of the conveyer. The blocks 42 are preferably anchored to the blocks 43 by means of screws or the like, as shown in Fig. 3. These clamping blocks are spaced at intervals around the conveyer and any number of blocks may be used; in the present instance four are illustrated.

It is contemplated that an operator may stand at the front end of the machine adjacent the conveyer and insert the heels in position between the retaining ring 39 and the blocks 42, while the conveyer is being rotated. And if any heels are improperly positioned, that is if they are not flat on the conveyer, but rest on the wedging elements 42, they will be swept out of the way by a stripper 44 supported above the upper surface of the conveyer so that they will not come into contact with the trimming elements.

As before related, the conveyer is adapted to be rotated in order to bring the heels into contact with the trimming elements 19 and 20, as shown in Fig. 3, and in order to hold the heels firmly against the upper surface of the conveyer while they are being trimmed, a roller 45 is mounted adjacent the cutting elements, the heels being adapted to pass under the roller and to be held thereby while being trimmed. This roller 45 is adjustably supported above the conveyer by means of a curved bracket 46 secured to the under side of the tiltable support 28ª and extending therethrough and also through the conveyer. An adjustable bifurcated arm 47 is clamped upon the end of the bracket for adjustably supporting the roller which is shown pivoted to said arm (Fig. 3).

After a heel has been trimmed and passed by the trimming elements in its circumferential course, it is brought into contact with the discharge mechanism for removing the heel from the conveyer. The discharge mechanism is best illustrated in Figs. 4 and 5. It consists of a spring operated sweep lever 48 having a short arm 49 which may be integral therewith or rigidly attached thereto, the arm 49 preferably extending at an acute angle from the pivot end of the lever. The said lever 48 is pivoted upon a vertical pivot secured in a stud supported by a bracket 50 attached to and extending from the tiltable support 28ª to a point adjacent the outer circumference of the conveyer. A coil spring 51 anchored at its lower end to the bracket 50 surrounds the said stud and is connected at its upper end to the arm 49 of the lever; the said spring being effective for returning the sweep lever to normal or inoperative position beyond the outer circumference of the conveyer, as shown in Fig. 4. The outer end of the sweep lever is bent downwardly and provided with a pivoted contact member 52 which is adapted to be pressed against the lateral side of the heel, as shown in dotted lines in Fig. 4, for discharging the same from the conveyer. The lever 48 is adapted to be automatically operated when a trimmed heel has been brought adjacent thereto by means of studs 53 rising from the upper surface of the conveyer adjacent the outer margin thereof and so positioned with reference to the supported heels that they engage the short arm 49 of the lever and swing the lever 48 to engage and discharge the heel that is adjacent thereto, the heel passing readily from its position since it is moved away from the wedging action of the inclined block 42.

In Fig. 6 there is illustrated a portion of a rubber heel with a breast portion 41 that is fringed at its lower edge, i. e. that portion which comes in contact with the ground, being the upper edge in the drawing. In trimming such a heel, it is highly desirable that the trimming elements and heel be held in biased relation so that only the upper edge thereof be trimmed. This is admirably accomplished by this machine in which the cutting elements 19 and 20 are supported in planes above the horizontal plane of the conveyer and interiorly thereof, or in other words within the central opening thereof at such a relative position that when the conveyer is properly tilted the fringed edges of the heels supported thereon will be brought into proper contact with the trimming elements during the revolutions of the conveyer. For variations in the thickness of the heels and the fringed edges, the frame that supports the trimming elements may be raised or lowered by the screw 17 and may be adjusted longitudinally by means of the screw 15.

The operation is as follows:

In the operation of this machine, the heel clamping blocks 42 are properly adjusted to accommodate the size of the heel to be trimmed, and the roller 45 is properly adjusted to accommodate the thickness of the heel. The conveyer is then tilted so that the fringed edges of the heels may be properly brought into contact with the trimming elements, adjusting the frame that supports the trimming elements if necessary. With the conveyer and parts properly adjusted and an initial supply of untrimmed heels on the conveyer, the motor M may be started to operate the driving member 2 which simultaneously rotates the trimming elements' shafts 7 and 8 in opposite directions through the pulleys 3, 4, 5 and 6 and the belts 4ª, 5ª and the crossed belt 6ª, and at the same time rotates the conveyer through belt 32ª, pulleys 32 and 31 and belt 30. During the operation of the conveyer, an operator may stand at some convenient point of the conveyer and feed the heels thereto by properly inserting them between the clamping blocks 42 and ring member 39, after the previous ones have been discharged therefrom, and if any are improperly positioned, they will be swept aside by the stripper 44. As the conveyer revolves, it is apparent that each heel will be brought into operative relation with the trimming elements as they pass in their circumferential course and when the trimmed heels reach the discharge mechanism they will be successively and automatically ejected by means of the sweep lever 48, as previously explained.

From the foregoing, it is apparent that a novel form of machine has been invented for trimming the breasts of heels, in which the heels are successively brought into contact in a biased relation with the trimming elements so that the fringed edges may be efficiently trimmed, in which the heels are properly held while being trimmed, and in which they are automatically discharged after being trimmed, and in which the conveyer and trimming elements are adjustable for different sizes of heels and different degrees of trimming.

We are aware that numerous details of construction may be varied through a wide range without departing from the principles of this invention, and we therefore do not purpose limiting the patent granted otherwise than necessitated by the prior art.

We claim as our invention:

1. In the heel trimming machine, a rotary ring-like conveyer, means for adjustably supporting the same in inclined position, a plurality of rotary cutting elements supported within said ring-like conveyer, and means for operating said conveyer and elements for the purpose set forth.

2. In a heel trimming machine, a rotary conveyer comprising a ring-like member having a retaining ring surrounding its inner margin and projecting thereabove, and clamping members thereon adapted for holding the heels against said retaining ring.

3. In a heel trimming machine, a plurality of mutually co-operating trimming elements, a rotary conveyer surrounding the same and having means for supporting the heels thereon, and a roller adjacent said elements adapted for riding over the heels during the cutting operation.

4. In a heel trimming machine, a tiltable support, a conveyer mounted thereon for rotary movement, said conveyer comprising a ring-like member having means for holding the heels with the breasts thereof adjacent the inner circumferential margin, and adjustable trimming elements supported interiorly of said ring-like member adapted for trimming the breasts of said heels during the rotation of said conveyer.

5. In a heel trimming machine, a conveyer comprising a flat ring-like member having means for supporting the heels adjacent the inner circumferential margin, means for tilting said conveyer and rotating the same, in combination with a pair of rotary cutting elements supported adjacent the inner circumference of said conveyer.

6. In a heel trimming machine, a tiltable support, a flat ring member rotatably secured to said support and having heel retaining means adjacent the inner circumferential margin thereof, a pair of vertically adjustable rotary trimming elements supported within said ring member adjacent said circumferential margin, and driving mechanism for rotating said ring member and trimming elements, 7. In a heel trimming machine, a rotary conveyer comprising a ring-like member having a circumferential flange at its inner periphery and obliquely adjustable blocks co-operating with said flange for retaining the heels therebetween, and rotary trimming elements within said ring-like member.

8. In a heel trimming machine, a rotary conveyer comprising a flat ring-like member having a flange extending upwardly from its inner periphery and obliquely arranged blocks for retaining the breasts of the heels adjacent said flange, and an ejector mechanism automatically operated by said ring-like member for ejecting said heels in combination with rotary trimming elements.

9. In a heel trimming machine, a rotary conveyer comprising a ring-like member having heel receiving pockets opening in the direction of rotation, rotary trimming elements within said ring member, and an ejector pivoted adjacent said conveyer and automatically actuated by said conveyer for ejecting said heels in the direction of rotation of said conveyer.

10. In a heel trimming machine, a rotary ring-like conveyer having a plurality of heel holding pockets opening in the direction of rotation, and a projection adjacent each pocket, an ejector pivoted adjacent said conveyer, said ejector being yieldably supported, and having an arm adapted for engagement by said projections for actuating said ejector for ejecting said heels in the direction of rotation, in combination with trimming elements positioned within said ring member.

In testimony whereof, we have hereunto subscribed our names in the presence of two subscribing witness.

GEORGE C. REEVES.
JOHN C. HINTZ.
REES BEYNON.

Witnesses.
CARLTON HILL,
JAMES M. O'BRIEN.